United States Patent Office 2,776,454
Patented Jan. 8, 1957

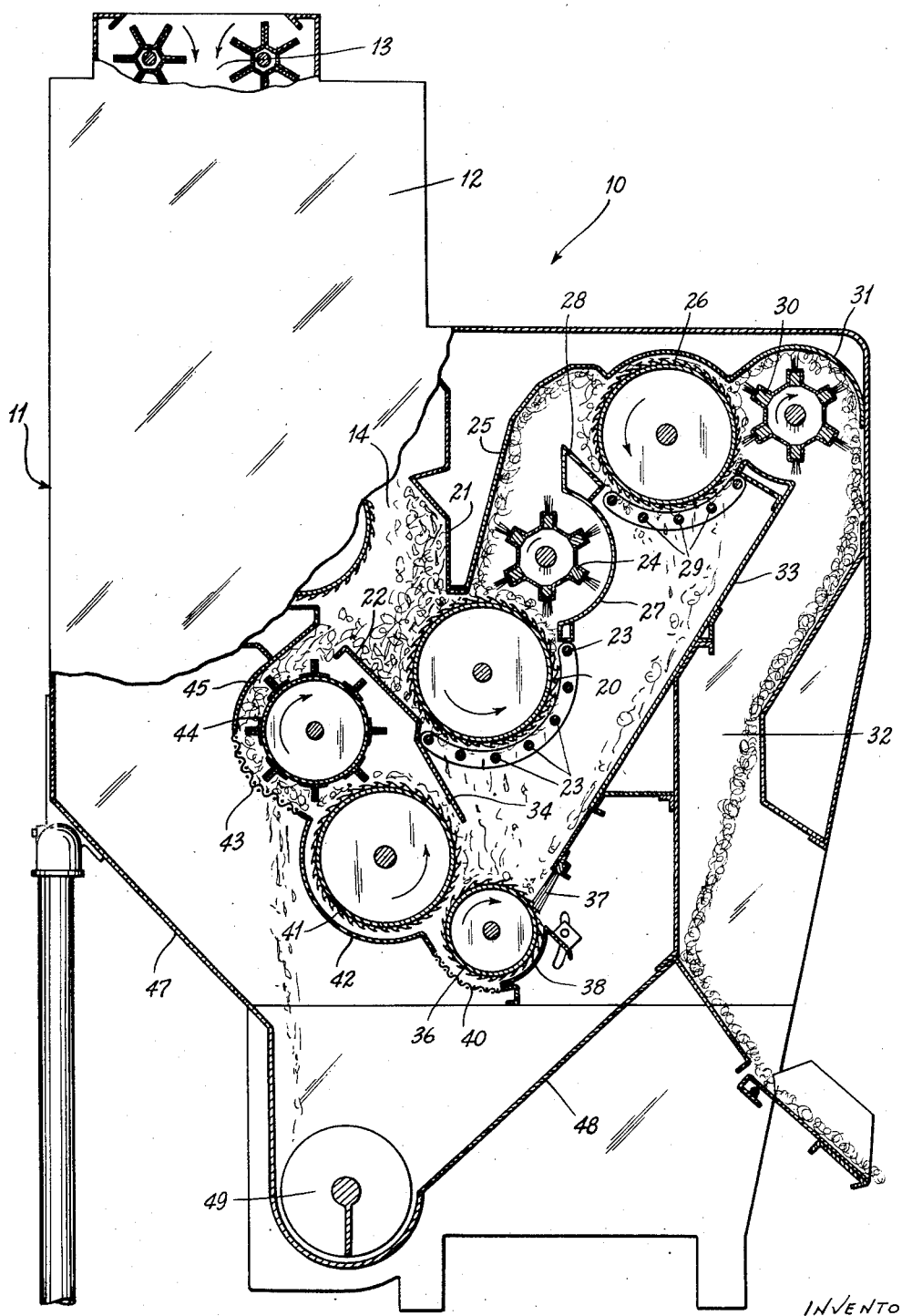

2,776,454

COTTON CLEANING MACHINERY

Thomas N. Dyson, Dallas County, Tex., assignor to John E. Mitchell Company, Dallas, Tex., a corporation of Missouri Application September 27, 1955, Serial No. 537,024

7 Claims. (Cl. 19—1)

This invention relates to improvements in cotton cleaning machinery, and particularly is concerned with an integrated unit having means for receiving the cotton and removing sticks and other trash therefrom. It is particularly concerned with an improvement in the machine of the application of Orville Mitchell and Eugene G. Walton, Jr., Serial No. 430,102, filed May 17, 1954, now Patent No. 2,739,353, assigned to the assignee hereof.

Raw cotton which is picked by mechanical means has always offered a problem in the cleaning field. Such raw cotton is usually laden with trash, sticks, stones, hulls, etc., which are required to be removed before the cotton is charged to the gin.

It has been found that this stick trash that has heretofore almost defied removal by known machinery can be removed by a special arrangement of the feed flow. A basic machine for doing this is disclosed in the Mitchell and Walton application. The raw cotton may be charged through preliminary cleaners, after which the feed is treated against beater or grid bars to expel the heavier sticks and other trash. The grids are separated far enough to pass even large sticks, and in so doing they admit loss of a considerable amount of cotton. The stream is then acted upon in a reclaiming step to remove the trash, separate and reclaim the lint from the sticks and trash, which last are discharged from the machine. The reclaimed cotton then is recombined with the main stream. By this wasting of cotton in a beater bar type of reclaiming device and reclaiming of the waste cotton with a reclaiming stage, the sticks problem can be satisfactorily met.

In the machine illustrated by the Mitchell and Walton application, certain means were illustrated for use in reclaiming cotton from the sticks and trash. The present invention improves on these means, so as to minimize the loss of cotton and yet to assure thorough elimination of sticks and trash. To this end, the present improvement has a saw-type doffer that withdraws cotton from a reclaiming saw like that of the former application. The saw doffer cooperates with a baffle to cause sticks, leaf and other trash accidentally picked up to be thrown back into the trash stream. Another doffer draws cotton from the saw, and both drives it over a screen for expulsion of small trash, and sends it back into the main stream of cotton moving onto the stick removers.

Therefore, it is an object of this invention to provide a cotton cleaning machine having means for dividing sticks, hulls, leaf and other trash, together with some cotton, from a stream of raw cotton, reclaiming the cotton from the sticks and trash, and recombining the reclaimed cotton with the main stream for further cleaning, all with improved efficiency, less loss of cotton, and more effective elimination of trash.

Further objects of this invention will appear in the detailed description which follows and will be further apparent to those skilled in the art.

For the purpose of illustration, there is shown in the accompanying drawing a preferred embodiment of this invention. It is to be understood that the invention is not limited thereto and that this drawing is for the purpose of example only.

The drawing is a front-to-rear sectional view of the integrated cotton cleaning machine.

The cotton cleaning machine of this invention is generally indicated at 10. The machine has a housing 11. Since usually the stick remover will be used with some pretreatment machinery, it has here been illustrated with a portion 12 of the housing 11 for containing such machinery. The entire machine has an inlet 13, and the pretreating section (where used) delivers a main stream of cotton to an entrance or inlet 14 of the stick removing section.

The inlet 14 delivers the cotton to a first saw cylinder 20. A baffle 21 forming one wall of the inlet aids in directing the cotton to the cylinder. An opposite baffle 22 defines a lower wall of the inlet, so that cotton entrained by the saw teeth of the rotating cylinder is caused to be forced over a plurality of beater bars 23, seven of such bars being illustrated. These bars are illustrated in the Mitchell and Walton application, and differ from those heretofore used, in that they are much more widely spaced apart. For example, they typically may be three-quarter inch round bars spaced so as to provide approximately a two-inch gap between bars. The gap must be at least above an inch to function as herein intended. This gap is so large that there is a deliberate wastage of cotton between the bars.

The cotton is doffed from the cylinder 20 by a doffer 24 and is caused to flow upwardly and forwardly against walls and the baffle 25 from the saw cylinder 20 to a second saw cylinder 26. The housing 27 terminates in a section 28 that confines the cotton taken up by the rotating cylinder 26.

The saw cylinder 26 is similar to the cylinder 20 and similarly operates against rods 29 like the bars 23.

Adjacent the second saw cylinder 26 there is a doffer cylinder 30. A baffle 31, which is a continuation of the baffle 25, extends above the saw 26 and the doffer 30, as illustrated, so that the cotton stream is confined and deflected by the baffle into an outlet passage 32 that may lead to the gin.

Beneath the beater bars 23 and 29 there is a lower wall 33 extending downwardly and to the rear until it is below the lower cylinder 20. Also below the cylinder 20, the lower portion 34 of the baffle 22 extends downwardly at an inclined angle to constitute a collecting means to dispose the waste from the beater bars upon the top of a reclaiming saw cylinder 36.

The reclaiming saw cylinder 36 sweeps across a brush 37 projecting out from the lower edge of the wall 33, the brush being of the type that causes cotton fibers to adhere to the teeth of the saw 36, but which does not prevent passage of sticks, trash and the like. There may be an adjustable gate 38, of a type that is known, which can adjust the size of the trash opening between the brush 37 and the gate.

The cylinder 36 operates against a screen 40. A saw cylinder 41 is located upwardly and to the left of the reclaiming saw cylinder 36 to doff the cotton fibers therefrom. With the present type of machine there is a substantial amount of cotton in the trash going to reclaiming saw 36 because of the deliberate wastage of cotton with the sticks passing through the bars 23 and 29.

Furthermore, in this cotton carried up by the cylinder 41 from the reclaimer saw 36, there is a certain amount of trash which has jumped the gap between the brush 37 and the gate 38. The teeth of the saw cylinder 41 discriminate between the reclaimed cotton and trash reaching this point by engaging the cotton and carrying it upwardly, at the same time slinging off the loose trash.

by centrifugal force through the gap below the baffle 34. This baffle 34 terminates high enough to provide ample space for the discharge of such trash, which joins the main stream of trash coming down the slide 33 to the brush 37.

A housing 42 is located underneath the saw cylinder 41 and extends upwardly and to the left of the cylinder into juxtaposition with a screen 43 located to the left of a beater type cylinder 44. The beater roll 44 carries cotton, with any small amount of trash that may be left in it, from the saw cylinder 41 against the screen 43 where the trash is expelled. The cylinder 44 then conveys the cleaned, reclaimed cotton against a baffle 45 that directs it again to the main stream of cotton at the inlet 14 to the stick remover.

The trash thrown outwardly past the screen 43, the screen 40, and the brush 37, descends to the bottom of the housing 10, being directed by downwardly converging walls 47 and 48 to some suitable means, such as the screw conveyer 49, to convey the trash out of the machine.

Operation

Raw cotton or partially cleaned cotton is introduced to the machine 10 through the inlet 13. Where the pretreating mechanism is used, the cotton is treated in the section 12 and delivered to the inlet 14 of the stick remover.

The cotton stream in the inlet 14 passes downwardly against the baffle 22 to the upper side of the saw cylinder 20. This cotton is entrained on the teeth of this cylinder and carried downwardly inside the baffle 22 against the widely spaced beater bars 23. These beater bars, when spaced far apart as herein disclosed, cause the sticks to align with the rods and to tend to roll through the gaps between the bars, the sticks being ejected therethrough by the effect of the rotary force of the cylinder 20. Also, hulls, leaf and other trash are whipped out of the cotton on the bars 23 and escape through the gaps between the bars. The sticks and other trash, together with a small percentage of cotton (about 3%) thus ejected fall down against the wall 33 and descend therealong to the reclaiming cylinder 36. In this operation, there is a deliberate loss of cotton (about 3%) through the bars 23 in order to rid the remaining stream of sticks, hulls, leaf and other trash.

The main stream of cotton retained on the cylinder 20 is then doffed by the doffing cylinder 24. This cotton is driven with considerable velocity against the wall 25 so that it travels upwardly and forwardly until it reaches the second saw cylinder 26. Any cotton that does not so travel is confined by the housing 27 and is returned to the cylinder 20.

The second cylinder 26 rotates counterclockwise, as shown, so that its teeth pick up the cotton and throw the same against the second set of beater bars 29, which are also widely spaced. When the cotton strikes these bars, additional sticks, hulls, leaf and other trash are thrown outwardly and fall downwardly to the reclaiming cylinder 36. Again there is a deliberate wasting of cotton (about 3%) to cause a free ejection of the sticks and other trash past the bars 29. The cotton that remains entrained on the cylinder and passes the bars 29 is carried to the doffing cylinder 30, which removes it and directs it upwardly along the baffle wall 31, and then downwardly to the outlet passage 32, for delivery to the gin.

The foregoing represents the flow of the main stream of cotton through the machine to the outlet.

In the meanwhile, the trash and deliberately wasted cotton that passed between bars 23 and 29 descend to the reclaiming saw cylinder 36. This saw rotates clockwise, as shown, past the brush 37. The brush sweeps the cotton lint onto the teeth of the saw, but permits most of the sticks and other trash to be ejected outwardly above the adjustable gate 38.

However, some of the trash jumps across the gap between the brush 37 and the gate 38 and is carried along with the reclaimed cotton on the cylinder 36. A part of this loose trash is thrown through the screen 40, but most of it passes on with the reclaimed cotton until this reclaimed cotton is transferred from cylinder 36 to cylinder 41. When this transfer of cotton is made (by reason of cylinder 41 running at a greater peripheral speed than cylinder 36), another separation takes place. This separation at the transfer point is due to the discriminatory action of the teeth on the saw cylinder 41. These teeth engage the reclaimed cotton and carry it upwardly, at the same time throwing the trash off by centrifugal force. The trash thus thrown off falls back onto the cylinder 36, which carries it under the brush 37 and throws it into the main stream of trash going down the slide 43.

The reclaimed, cleaned cotton entrained on the teeth of the cylinder 41 then moves to the beater roll 44 and is doffed thereby. The cylinder 44 drives the cotton and any trash entrained therewith against the screen 43. Most of the remaining trash is expelled through the screen while the cleaned, reclaimed cotton is caused to continue upwardly along, and directed by the baffle 45 for recombination with the main stream at the inlet 14. Trash removed from screens 43 and 40 is removed from the machine by conveyer 49.

With the present machine, there is less loss of cotton than with the arrangement of the Mitchell and Walton machine. Also, there is a very thorough cleaning of the cotton deliberately ejected through the grid-bars 23 and 29 and sent to the reclaimer mechanism. The aforesaid discriminating action of the saw cylinder 41 affords a notably different separation of cotton and trash. To illustrate, the use of another type of doffer, such as a brush doffer, would require bringing the baffle 34 close to the reclaiming saw 36 to avoid throwing the doffed cotton as well as trash back into the trash coming down the trash slide 33. But that design destroys the possibility of eliminating trash thereat and sending it directly into the trash stream, without at least to a considerable extent, recirculating it into the main cotton stream. The present construction of saw doffer and gap below the baffle 34, permits a separation of reclaimed cotton and remaining trash that otherwise could not be effected.

Various changes and modifications may be made in this invention, as may be apparent to those skilled in the art. Such changes and modifications are within the scope of this invention, as defined by the claims appended hereto.

What is claimed is:

1. In a cotton cleaning machine: a housing having a cotton inlet and an outlet; at least one rotary, cotton-entraining cylinder adjacent the inlet to receive cotton delivered through the inlet; a plurality of beater bars adjacent the cylinder against which the cylinder can beat the entrained cotton, the bars providing elongated slots and being spaced apart sufficiently to enable sticks and other trash to be ejected and to escape from the cylinder, along with a substantial amount of cotton; means to doff the entrained cotton from the cylinder and conduct it toward the outlet; means to collect the sticks and other trash and the cotton with them, that are ejected between the bars; a reclaiming means to which the collecting means delivers the sticks, trash and cotton, the reclaiming means having means to separate cotton from the sticks and trash, although imperfectly, and to expel the latter; means to withdraw the cotton from the reclaiming means comprising a rotary saw to entrain cotton and trash not expelled by the reclaiming means; and baffle means providing a confined space for delivery of such cotton back to the first-named rotary, cotton-entraining cylinder for repassage through the machine, the baffle providing a gap adjacent the rotary saw for the saw to fling trash from the cotton-entrained thereon prior to delivery of the cotton back to the first-named cylinder.

2. The machine of claim 1, wherein the gap is disposed adjacent the reclaiming means to enable the trash to be flung back onto the reclaiming means.

3. The machine of claim 1, wherein the reclaiming means is a saw cylinder, located below the first-named cotton-entraining cylinder so that trash may descend from the bars to the saw cylinder; and wherein the baffle extends below the cotton-entraining cylinder and to one side thereof, and the rotary saw to withdraw cotton from the reclaiming saw is above the reclaiming saw; and wherein the baffle terminates a distance above the reclaiming saw; and wherein there is doffing means to remove the cotton from the rotary saw and effect its delivery back to the first-named cylinder.

4. In a cotton cleaning machine: a housing having a cotton inlet passage and a cotton outlet passage; a rotary cotton-entraining cylinder at the delivery end of the inlet passage; a plurality of beater bars adjacent the cylinder against which the cylinder can beat the entrained cotton, the bars providing elongated slots and being spaced apart sufficiently to enable sticks and other trash to be ejected between them and escape from the cylinder, along with a substantial amount of cotton; means to doff the entrained cotton from the cylinder and conduct it toward the outlet; means to collect the sticks and other trash and cotton ejected between the bars; a reclaiming device to which the collecting means delivers the sticks and other trash and cotton, the reclaiming device having means to separate the cotton from the sticks and other trash; and means to deliver the cotton thus separated to the cotton-entraining cylinder for repassage thereover, said last-named means comprising a saw cylinder adapted to pick up said separated cotton from the reclaiming device, and means for removing cotton from the saw cylinder, directing it back to said cotton-entraining cylinder.

5. A cotton cleaning machine comprising: a housing having an inlet passage and an outlet passage; at least two rotary cotton-entraining cylinders disposed sequentially in the housing between the inlet passage and the outlet passage, the inlet passage conducting the cotton to the first such cylinder; doffing means adjacent each cylinder to remove the entrained cotton from that cylinder and direct it toward the next in series; doffing means to remove the entrained cotton from the last cylinder and direct it toward the outlet passage, each cylinder having a plurality of beater bars adjacent the cylinder against which the cylinder can beat the entrained cotton, the bars providing elongated slots and being spaced apart a sufficient distance to pass sticks and other trash with a substantial proportion of waste cotton, the gaps being at least about one to two inches; means to collect the waste cotton from the mass ejected by the cylinders and beaters; means to reclaim the cotton from the sticks and trash in the mass thus collected; and means to return the cotton thus collected to one of the rotary cotton-entraining cylinders for repassage thereover, said last-named means comprising a saw cylinder situated above and to one side of the reclaiming means and beneath the first cotton-entraining cylinder, said saw cylinder being adapted to pick up the cotton separated from the reclaiming means and deliver it to means for directing it back to said cotton-entraining cylinder.

6. A cotton cleaning machine comprising: a housing having an inlet passage and an outlet passage; at least two rotary cotton-entraining cylinders disposed sequentially in the housing between the inlet passage and the outlet passage, the inlet passage conducting the cotton to the first such cylinders; doffing means adjacent each cylinder to remove the entrained cotton from that cylinder and direct it toward the next in series; doffing means to remove the entrained cotton from the last cylinder and direct it toward the outlet passage, each cylinder having a plurality of beater bars adjacent the cylinder against which the cylinder can beat the entrained cotton, the bars providing elongated slots and being spaced apart a sufficient distance to pass sticks and other trash with a substantial proportion of waste cotton, the gaps being at least about one to two inches; means to collect the waste cotton from the mass ejected by the cylinders and beaters; means to reclaim the cotton from the sticks and trash in the mass thus collected; and means to return the cotton thus collected to one of the rotary cotton-entraining cylinders for repassage thereover, said last-named means comprising a saw cylinder situated above and to one side of the reclaiming means and beneath the first cotton-entraining cylinder, and baffle means extending beneath said first cotton-entraining cylinder and between it and the saw cylinder for directing trash and cotton onto said reclaiming means and to prevent mixing thereof with the cotton removed by the saw cylinder.

7. A cotton cleaning machine comprising: a housing having an inlet passage and an outlet passage; at least two rotary cotton-entraining cylinders disposed sequentially in the housing between the inlet passage and the outlet passage, the inlet passage conducting the cotton to the first such cylinders; doffing means adjacent each cylinder to remove the entrained cotton from that cylinder and direct it toward the next in series; doffing means to remove the entrained cotton from the last cylinder and direct it toward the outlet passage, each cylinder having a plurality of beater bars adjacent the cylinder against which the cylinder can beat the entrained cotton, the bars providing elongated slots and being spaced apart a sufficient distance to pass sticks and other trash with a substantial proportion of waste cotton, the gaps being at least about one to two inches; means to collect the waste cotton from the mass ejected by the cylinders and beaters; means to reclaim the cotton from the sticks and trash in the mass thus collected; and means to return the cotton thus collected to one of the rotary cotton-entraining cylinders for repassage thereover, said last-named means comprising a saw cylinder situated above and to one side of the reclaiming means and beneath the first cotton-entraining cylinder, and baffle means extending beneath said first cotton-entraining cylinder and between it and the saw cylinder for directing trash and cotton onto said reclaiming means and to prevent mixing thereof with the cotton removed by the saw cylinder, said baffle means being of a sheet-like nature and further extending upwardly from the beater bars associated with the first cylinder and to one side of said cylinder for receiving the cotton stream from the saw cylinder and directing it against said first cylinder.

No references cited.